(12) United States Patent
Nair et al.

(10) Patent No.: US 8,335,257 B2
(45) Date of Patent: Dec. 18, 2012

(54) VECTOR SELECTION DECISION FOR PIXEL INTERPOLATION

(75) Inventors: Hari N. Nair, Bangalore (IN); Gordon Petrides, San Jose, CA (US)

(73) Assignee: Tamiras Per Pte. Ltd., LLC, Dover, DE (US)

( * ) Notice: Subject to any disclaimer, the term of this patent is extended or adjusted under 35 U.S.C. 154(b) by 1043 days.

(21) Appl. No.: 12/331,304

(22) Filed: Dec. 9, 2008

(65) Prior Publication Data

US 2009/0135913 A1   May 28, 2009

Related U.S. Application Data

(63) Continuation of application No. 10/866,460, filed on Jun. 10, 2004, now Pat. No. 7,499,494.

(60) Provisional application No. 60/532,427, filed on Dec. 23, 2003.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.16
(58) Field of Classification Search .............. 375/240.01
See application file for complete search history.

(56) References Cited

U.S. PATENT DOCUMENTS

| | | |
|---|---|---|
| 4,125,856 A | 11/1978 | Netravali |
| 4,651,211 A | 3/1987 | Weckenbrock |
| 4,652,907 A | 3/1987 | Fling |
| 4,980,764 A | 12/1990 | Henot |
| 5,259,040 A | 11/1993 | Hanna |
| 5,311,306 A | 5/1994 | Tanaka |
| 5,317,397 A | 5/1994 | Odaka |
| 5,400,083 A | 3/1995 | Mizusawa |
| 5,500,686 A | 3/1996 | Yamaguchi |
| 5,519,438 A | 5/1996 | Elliott |
| 5,539,663 A | 7/1996 | Agarwal |

(Continued)

FOREIGN PATENT DOCUMENTS

CN    1127906    7/1996

(Continued)

OTHER PUBLICATIONS

Hiromatsu, T., et al., "Introduction to Statistics," 1st ed., Asakura Shoten, Ltd., Oct. 15, 1998, 9 pages.

(Continued)

*Primary Examiner* — Nhon Diep
(74) *Attorney, Agent, or Firm* — Christensen O'Connor Johnson Kindness PLLC (57) ABSTRACT

Methods and apparatus, including computer program products, implementing and using techniques for determining motion vectors to be used for interpolation of intermediary frames in a digital video sequence are disclosed. A first image frame including several image patches is received. A second image frame including one or more image patches corresponding to the image patches in the first image frame is received. For each image patch that occurs in both frames, the following operations occur: forward and backward motion vectors are determined for the image patch in the first image frame, forward and backward motion vectors are determined for the image patch in the second image frame, one motion vector from the first image frame and one motion vector from the second frame are selected and the selected motion vectors are used to establish an intermediary position of the image patch in an interpolated frame between the frames.

13 Claims, 5 Drawing Sheets

U.S. PATENT DOCUMENTS

| | | | |
|---|---|---|---|
| 5,583,580 A * | 12/1996 | Jung | 348/699 |
| 5,764,803 A | 6/1998 | Jacquin | |
| 5,777,682 A | 7/1998 | De Haan | |
| 5,786,872 A | 7/1998 | Miyazaki | |
| 5,799,111 A | 8/1998 | Guissin | |
| 5,819,035 A | 10/1998 | Devaney | |
| 5,838,383 A | 11/1998 | Chimoto | |
| 5,844,623 A | 12/1998 | Iwamura | |
| 5,987,164 A | 11/1999 | Szeliski | |
| 5,990,978 A | 11/1999 | Kim | |
| 6,041,145 A | 3/2000 | Hayashi | |
| 6,178,205 B1 | 1/2001 | Cheung | |
| 6,178,265 B1 | 1/2001 | Haghighi | |
| 6,236,763 B1 | 5/2001 | Wong | |
| 6,246,827 B1 | 6/2001 | Strolle | |
| 6,278,736 B1 | 8/2001 | De Haan | |
| 6,300,985 B1 | 10/2001 | Lowe | |
| 6,317,165 B1 | 11/2001 | Balram | |
| 6,349,114 B1 | 2/2002 | Mory | |
| 6,359,658 B1 | 3/2002 | He | |
| 6,462,790 B1 | 10/2002 | Lowe | |
| 6,658,059 B1 | 12/2003 | Iu | |
| 6,674,488 B1 | 1/2004 | Satoh | |
| 6,774,954 B1 | 8/2004 | Lee | |
| 7,003,173 B2 | 2/2006 | Deshpande | |
| 7,027,102 B2 | 4/2006 | Sacca | |
| 7,046,306 B2 | 5/2006 | Zhai | |
| 7,076,113 B2 | 7/2006 | Le Dinh | |
| 7,203,237 B2 | 4/2007 | Fernandes | |
| 7,274,408 B2 | 9/2007 | Shan | |
| 7,324,163 B2 | 1/2008 | Bacche | |
| 7,346,109 B2 | 3/2008 | Nair | |
| 7,346,226 B2 | 3/2008 | Shyshkin | |
| 7,349,033 B2 | 3/2008 | Chang | |
| 7,457,438 B2 | 11/2008 | Nair | |
| 7,480,334 B2 | 1/2009 | Nair | |
| 7,499,494 B2 | 3/2009 | Nair | |
| 7,535,515 B2 | 5/2009 | Bacche | |
| 2002/0113901 A1 | 8/2002 | Osberger | |
| 2002/0163595 A1 | 11/2002 | Adams | |
| 2002/0163969 A1 | 11/2002 | Zhong | |
| 2002/0191841 A1 | 12/2002 | Harman | |
| 2002/0196362 A1 | 12/2002 | Yang | |
| 2003/0072373 A1 | 4/2003 | Sun | |
| 2003/0086498 A1 | 5/2003 | Lee | |
| 2003/0152149 A1 | 8/2003 | Denolf | |
| 2003/0156646 A1 | 8/2003 | Hsu | |
| 2003/0194151 A1 | 10/2003 | Wang | |
| 2004/0008777 A1 | 1/2004 | Swartz | |
| 2004/0120401 A1 | 6/2004 | Linzer | |
| 2004/0189875 A1 | 9/2004 | Zhai | |
| 2004/0202250 A1 | 10/2004 | Kong | |
| 2005/0013365 A1 | 1/2005 | Mukerjee | |
| 2005/0013378 A1 | 1/2005 | Song | |
| 2005/0128355 A1 | 6/2005 | Kang | |
| 2005/0134740 A1 | 6/2005 | Bacche | |
| 2005/0168650 A1 | 8/2005 | Walls | |
| 2005/0276329 A1 | 12/2005 | Adiletta | |
| 2006/0072790 A1 | 4/2006 | Wittebrood | |
| 2006/0077306 A1 | 4/2006 | Suyambukesan | |
| 2006/0232666 A1 | 10/2006 | Op De Beeck | |
| 2007/0092111 A1 | 4/2007 | Wittebrood | |

FOREIGN PATENT DOCUMENTS

| | | |
|---|---|---|
| EP | 0 242 935 A1 | 1/1987 |
| EP | 0 294 956 A2 | 12/1988 |
| EP | 0 376 330 A2 | 7/1990 |
| EP | 0 466 981 A1 | 1/1992 |
| EP | 0 772 365 A2 | 5/1997 |
| EP | 0 849 950 A2 | 6/1998 |
| EP | 1 117 251 A1 | 7/2001 |
| EP | 1 549 048 A2 | 6/2005 |
| EP | 1 587 328 A2 | 10/2005 |
| GB | 2 286 740 A | 9/1995 |
| GB | 2 311 183 A | 9/1997 |
| JP | 01-318491 A | 12/1989 |
| JP | 8-79760 A | 3/1996 |
| JP | 08-163583 A | 6/1996 |
| JP | 09-046726 A | 2/1997 |
| JP | 2737146 B2 | 1/1998 |
| JP | 10-233958 A | 9/1998 |
| JP | 2942261 B2 | 6/1999 |
| JP | 11-317943 A | 11/1999 |
| JP | 2000-188680 A | 7/2000 |
| JP | 3231309 B2 | 9/2001 |
| WO | 87/05770 A1 | 9/1987 |
| WO | 94/06098 A1 | 3/1994 |
| WO | 99/60779 A1 | 11/1999 |
| WO | 00/30359 A1 | 5/2000 |
| WO | 00/54516 A1 | 9/2000 |
| WO | 02/09611 A2 | 2/2002 |
| WO | 02/19721 A2 | 3/2002 |
| WO | 02/087210 A2 | 10/2002 |
| WO | 03/007618 A2 | 1/2003 |

OTHER PUBLICATIONS

European Office Action mailed Apr. 29, 2010, issued in European Application No. EP 04 258 046, filed Dec. 22, 2004, 5 pages.

European Office Action mailed May 18, 2010, issued in European Application No. EP 04 257 653.8, filed Dec. 14, 2004, 7 pages.

Chinese Office Action mailed Apr. 6, 2011, issued in Chinese Application No. CN 200810088727.4, filed Dec. 22, 2004, 4 pages.

Japanese Office Action mailed Feb. 22, 2011, issued in Japanese Application No. JP 2004-361159, filed Dec. 14, 2004, 11 pages.

Korean Office Action mailed Mar. 21, 2011, issued in Korean Application No. KR 10-2004-0100131, filed Dec. 2, 2004, 6 pages.

Korean Office Action mailed Mar. 30, 2011, issued in Korean Application No. KR 10-2004-0109975, filed Dec. 22, 2004, 6 pages.

Chinese Office Action mailed Apr. 6, 2011, issued in Chinese Application No. CN 200810088727.4, filed Dec. 22, 2004, 7 pages.

Korean Office Action mailed Apr. 11, 2011, issued in Korean Application No. KR 110-2004-0100127, filed Dec. 2, 2004, 6 pages.

Japanese Office Action mailed Apr. 8, 2011, issued in Japanese Application No. JP 2004-369568, filed Dec. 21, 2004, 7 pages.

Taiwanese Office Action mailed May 20, 2011, issued in Taiwanese Application No. TW 093140046, filed Dec. 22, 2004, 14 pages.

Australian Patent Office Search Report mailed Feb. 2, 2006, issued in corresponding Singapore Patent Application No. 200406853-2, filed Nov. 24, 2004, 6 pages.

Australian Patent Office Search Report mailed Feb. 8, 2006, issued in Singapore Application No. SG 200406862-3, filed Nov. 24, 2004, which corresponds to U.S. Patent No. 7,480,334, issued Jan. 20, 2009, 4 pages.

Australian Patent Office Written Opinion mailed Feb. 14, 2006, issued in Singapore Application No. SG 200407681-6, filed Dec. 23, 2004, which corresponds to U.S. Patent No. 7,535,515, issued May 19, 2009, 5 pages.

Australian Patent Office Search Report mailed Feb. 14, 2006, issued in Singapore Application No. SG 400407681-6, filed Dec. 23, 2004, which corresponds to U.S. Patent No. 7,535,515, issued May 19, 2009, 4 pages.

Australian Patent Office Examination Report mailed May 18, 2007, issued in Singapore Application No. SG 200406810-2, filed Nov. 22, 2004, which corresponds to U.S. Patent No. 7,346,226, issued Mar. 18, 2008, 4 pages.

Australian Patent Office Search Report and Written Opinion mailed May 31, 2006, issued in corresponding Singapore Application No. SG 200406810-2, filed Nov. 22, 2004, which corresponds to U.S. Patent No. 7,346,226, issued Mar. 18, 2008, 6 pages.

Danish Patent & Trademark Office Examination Report mailed Mar. 23, 2007, issued in Singapore Application No. SG 200407680-8, filed Nov. 22, 2004, which corresponds to U.S. Patent No. 7,457,438, issued Nov. 25, 2008, 9 pages.

European Examination Report mailed Sep. 11, 2006, issued in European Patent Application No. EP 04 25 7653.8, filed Dec. 14, 2004, which corresponds to U.S. Patent No. 7,346,226, issued Mar. 18, 2008, 8 pages.

European Examination Report mailed Nov. 12, 2007, issued in European Patent Application No. EP 04 257 854.2, filed Dec. 16, 2004, which corresponds to U.S. Patent No. 7,480,334, issued Jan. 20, 2009, 5 pages.

European Examination Report mailed Nov. 13, 2007, issued in corresponding European Patent Application No. EP 04 257 855.9, filed Dec. 16, 2004, 2 pages.
European Patent Office Search Report mailed Jun. 1, 2005, issued in European Patent Application No. EP 04 25 8048.0, filed Dec. 22, 2004, which corresponds to U.S. Patent No. 7,535,515, issued May 19, 2009, 3 pages.
European Patent Office Search Report mailed Jan. 12, 2006, issued in corresponding European Patent Application No. EP 04 25 7855.9, filed Dec. 16, 2004, 3 pages.
European Patent Office Search Report mailed Jan. 17, 2006, issued in European Patent Application No. EP 04 25 8046.4, filed Dec. 22, 2004, which corresponds to U.S. Patent No. 7,457,438, issued Nov. 25, 2008, 4 pages.
European Patent Office Search Report mailed Apr. 11, 2006, issued in corresponding European Patent Application No. EP 04 25 7653.8, filed Dec. 14, 2004, which corresponds to U.S. Patent No. 7,346,226, issued Mar. 18, 2008, 4 pages.
European Patent Office Search Report mailed Apr. 13, 2006, issued in European Patent Application No. EP 04 25 7854.2, filed Dec. 16, 2004, which corresponds to U.S. Patent No. 7,480,334, issued Jan. 20, 2009, 3 pages.
European Patent Office Search Report mailed Sep. 17, 2008, issued in European Patent Application No. EP 05 25 6353.3, filed Oct. 13, 2005, which corresponds to U.S. Patent No. 7,324,163, issued Jan. 29, 2008, 6 pages.
Examination Report mailed Sep. 28, 2006, issued in Singapore Application No. SG 200506302-9, filed Sep. 29, 2005, which corresponds to U.S. Patent No. 7,324,163, issued Jan. 29, 2008, 4 pages.
First Office Action mailed Aug. 17, 2007, issued in corresponding Chinese Application No. 200410102089.9, filed Dec. 22, 2004, 13 pages.
First Office Action mailed Aug. 24, 2007, issued in Chinese Application No. 200410102094.X, filed Dec. 22, 2004, which corresponds to U.S. Patent No. 7,480,334, issued Jan. 20, 2009, 7 pages.
Office Action mailed Nov. 6, 2007, issued in U.S. Appl. No. 10/868,169, filed Oct. 7, 2004, 13 pages.
Office Action mailed Dec. 13, 2007, issued in corresponding U.S. Appl. No. 10/866,460, filed Jun. 10, 2004, 5 pages.
Office Action mailed Jan. 15, 2008, issued in U.S. Appl. No. 10/833,198, filed Apr. 26, 2004, 7 pages.
Office Action mailed Apr. 22, 2008, issued in U.S. Appl. No. 10/868,169, filed Oct. 7, 2004, 15 pages.
Office Action mailed May 6, 2008, issued in corresponding U.S. Appl. No. 10/866,460, filed Jun. 10, 2004, 6 pages.
Office Action mailed Jun. 26, 2008, issued in U.S. Appl. No. 10/833,198, filed Apr. 26, 2004, 7 pages.
Search Report mailed Sep. 28, 2006, issued in Singapore Application No. SG 200506302-9, filed Sep. 29, 2005, which corresponds to U.S. Patent No. 7,324,163, issued Jan. 29, 2008, 4 pages.
Bellers, E. B., and G. De Haan, "Advanced De-Interlacing Techniques," Proceedings of the ProRISC/IEEE Workshop on Circuits, Systems and Signal Processing, Mierlo, Netherlands, Nov. 1996, pp. 1-13.
Braun, M., et al., "Motion-Compensating Real-Time Format Converter for Video on Multimedia Displays," Proceedings of the IEEE 4th International Conference on Image Processing (ICIP '97), Washington, D.C., Oct. 26-29, 1997, vol. 1, pp. 125-128.
Choi, S.-U., et al., "Motion Adaptive 3D Y/C Separation Algorithm Using Motion Estimation and Motion Compensation," IEEE Transactions on Consumer Electronics 47(4):770-778, Nov. 2001.
De Haan, G., "IC for Motion Compensated De-Interlacing, Noise Reduction, and Picture Rate Conversion," Digest of Technical Papers: IEEE International Conference on Consumer Electronics (ICCE), Los Angeles, Jun. 22-24, 1999, pp. 212-213.
De Haan, G., and E. B. Bellers, "De-Interlacing of Video Data," IEEE Transactions on Consumer Electronics 43(3):819-825, Aug. 1997.
De Haan, G., and R. J. Schutten, "Real-Time 2-3 Pull-Down Elimination Applying Motion Estimation/Compensation in a Programmable Device," Digest of Technical Papers: IEEE International Conference on Consumer Electronics (ICCE), Jun. 2-4, 1998, pp. 356-357.

De Haan, G., et al., "Television Noise Reduction IC," IEEE Transactions on Consumer Electronics 44(1):143-154, Feb. 1998.
Delogne, P., et al., "Improved Interpolation, Motion Estimation, and Compensation for Interlaced Pictures," IEEE Transactions on Image Processing 3(5):482-491, Sep. 1994.
Gu, Q. S., et al., "IIR Digital Filters for Sampling Structure Conversion and Deinterlacing of Video Signals," Proceedings of the IEEE International Symposium on Circuits and Systems (ISCAS '95), Seattle, Apr. 28-May 3, 1995, vol. 2, pp. 973-976.
Jostschulte, K., et al., "A Subband Based Spatio-Temporal Noise Reduction Technique for Interlaced Video Signals," Digest of Technical Papers: IEEE International Conference on Consumer Electronics (ICCE), Los Angeles, Jun. 2-4, 1998, pp. 438-439.
Jostschulte, K., et al., "Perception Adaptive Temporal TV-Noise Reduction Using Contour Preserving Prefilter Techniques," IEEE Transactions on Consumer Electronics 44(3):1091-1096, Aug. 1998.
Kalevo, O., and P. Haavisto, "Deinterlacing of Video Signals Using Nonlinear Interpolation With Simple Motion Compensation," Proceedings of the IEEE Winter Workshop on Nonlinear Digital Signal Processing, Jan. 17-20, 1993, pp. 4.1-4.6.
Kalevo, O., and P. Haavisto, "Motion Compensated Deinterlacing," Digest of Technical Papers: IEEE International Conference on Consumer Electronics (ICCE), Rosemont, Ill., Jun. 8-10, 1993, pp. 40-41.
Kovačević, J., et al., "Deinterlacing by Successive Approximation," IEEE Transactions on Image Processing 6(2):339-344, Feb. 1997.
Kwon, O., et al., "Deinterlacing Using Directional Interpolation and Motion Compensation," IEEE Transactions on Consumer Electronics 49(1):198-203, Feb. 2003.
Liang, Y., "Phase-Correlation Motion Estimation," Digital Video Processing (EE 392J): Student Final Project, Stanford University, Palo Alto, Calif., Winter 2000, pp. 1-9.
Migliorati, P., and S. Tubaro, "Multistage Motion Estimation for Image Interpolation," Signal Processing: Image Communication 7(3):187-199, Sep. 1995.
Oh, H.-S., et al., "Spatio-Temporal Edge-Based Median Filtering for Deinterlacing," Digest of Technical Papers: IEEE International Conference on Consumer Electronics (ICCE), Los Angeles, Jun. 13-15, 2000, pp. 52-53.
Ohm, J.-R., and K. Rümmler, "Variable-Raster Multiresolution Video Processing With Motion Compensation Techniques," Proceedings of the IEEE 4th International Conference on Image Processing (ICIP '97), Washington, D.C., Oct. 26-29, 1997, vol. 1, pp. 759-762.
Park, J.-I., and C. W. Lee, "Robust Estimation of Camera Parameters From Image Sequence for Video Composition," Signal Processing: Image Communication 9(1):43-53, Nov. 1996.
Patti, A. J., et al., "A New Motion-Compensated Reduced—Order Model Kalman Filter for Space-Varying Restoration of Progressive and Interlaced Video," IEEE Transactions on Image Processing 7(4):543-554, Apr. 1998.
Ryu, C., and S. P. Kim, "Deinterlacing Using Motion Compensated Local Spectra," Proceedings of the 29th Asilomar Conference on Signals, Systems and Computers, Pacific Grove, Calif., Oct. 30-Nov. 2, 1995, vol. 2, pp. 1394-1397.
Schu, M., et al., "System on Silicon—IC for Motion Compensated Scan Rate Conversion, Picture-in-Picture Processing, Split Screen Applications and Display Processing," IEEE Transactions on Consumer Electronics 45(3):842-850, 1999.
Sun, C., "De-Interlacing of Video Images Using a Shortest Path Technique," IEEE Transactions on Consumer Electronics 47(2):225-230, May 2001.
Japanese Office Action mailed Jun. 17, 2010, issued in Japanese Application No. JP 2004-369568, filed Dec. 21, 2004, which corresponds to U.S. Patent No. 7,480,334, issued Jan. 20, 2009, 3 pages.
Notice of Allowance mailed Nov. 10, 2010, issued in U.S. Appl. No. 12/257,204, filed Oct. 23, 2008, 28 pages.
Notice of Allowance mailed Mar. 29, 2011, issued in U.S. Appl. No. 12/257,204, filed Oct. 23, 2008, 11 pages.
Japanese Office Action mailed Mar. 29, 2011, issued in Japanese Application No. JP 2004-370682, filed Dec. 22, 2004, 4 pages.
"Basic Statistics," in Chikio Hayashi (ed.), Apr. 25, 1991, Asakura Book Co., pp. 76-77.

Japanese Office Action mailed Jul. 19, 2011, issued in Japanese Application No. JP 2004-361159, filed Dec. 14, 2004, 6 pages.

Thomas, G. A., "A Comparison of Motion-Compensated Interlace-to-Progressive Conversion Methods," BBC Research and Development Report (BBC RD Aug. 1996), 18 pages.

Vandendorpe, L., et al., "Generalized Interpolators for Advanced Movement-Compensated 50HZ-60HZ Conversion of Interlaced Sequences," Proceedings of the IEEE 4th International Conference on Image Processing (ICIP '95), Washington, D.C., Oct. 22-26, 1997, vol. 2, pp. 237-240.

Vella, F., et al., "Digital Image Stabilization by Adaptive Block Motion Vectors Filtering," IEEE Transactions on Consumer Electronics 48(3):796-801, Aug. 2002.

Yang, S., et al., "Low Bit Rate Video Sequence Coding Artifact Removal," Proceedings of the IEEE 4th Workshop on Multimedia Signal Processing, Cannes, France, Oct. 3-5, 2001, pp. 53-58.

Yuen, M., and H. R. Wu, "A Survey of Hybrid MC/DPCM/DCT Video Coding Distortions," Signal Processing 70(3):247-278, Nov. 1998.

Office Action mailed Jan. 6, 2010, issued in U.S. Appl. No. 12/257,204, filed Oct. 23, 2008, 9 pages.

Final Office Action mailed May 26, 2010, issued in U.S. Appl. No. 12/257,204, filed Oct. 23, 2008, 15 pages.

Office Action mailed Apr. 24, 2008, issued in U.S. Appl. No. 10/986,518, filed Nov. 10, 2004, 12 pages.

Final Office Action mailed Oct. 8, 2008, issued in U.S. Appl. No. 10/986,518, filed Nov. 10, 2004, 7 pages.

Japanese Office Action mailed Jun. 28, 2010, issued in Japanese Application No. JP 2004-370666, filed Dec. 22, 2004, which corresponds to U.S. Patent No. 7,457,438, issued Nov. 25, 2008, 4 pages.

European Office Action mailed Mar. 16, 2012, issued in EP 04 258 046.4, filed Dec. 22, 2004, 3 pages.

Japanese Office Action mailed Oct. 4, 2010, issued in Japanese Application No. JP 2004-370682, filed Dec. 22, 2004, 3 pages.

* cited by examiner

VECTOR SELECTION DECISION FOR PIXEL INTERPOLATION

CROSS REFERENCE TO RELATED APPLICATIONS

This application claims is a continuation application and claims benefit under 35 USC 120 of U.S. patent application Ser. No. 10/866,460 filed Jun. 10, 2004 which claimed priority to U.S. Provisional Patent Application No. 60/532,427, filed Dec. 23, 2003, and entitled "Recursive Hierarchical Motion Compensated Frame Rate Conversion," all of which are hereby incorporated by reference herein.

This application is also related to U.S. patent application entitled: "Motion Vector Computation For Video Sequences" by Nair et al., filed Apr. 26, 2004, which is hereby incorporated by reference herein in its entirety.

BACKGROUND

This invention relates to improving video and graphics processing.

At low display refresh rates (for example, 50 fields/sec for interlaced video material, and 24 frames/sec for film-originated material) on digital display devices, a display artifact referred to as "area flicker" can occur. The area flicker becomes more visible as the size of the display increases, due to the high sensitivity to flicker in the human visual peripheral region. A simple solution for reducing the area flicker is to increase the display refresh rate by repeating the input fields or frames at a higher rate (for example, 100 fields/sec for interlaced video). This solves the area flicker problem for static scenes. However, the repetition introduces a new artifact in scenes with motion, known as "motion judder" or "motion smear," particularly in areas with high contrast, due to the human eye's tendency to track the trajectory of moving objects. For this reason, motion compensated frame interpolation is preferred, in which the pixels are computed in an interpolated frame or field at an intermediate point on a local motion trajectory, so that there is no discrepancy between an expected image motion due to eye tracking and a displayed image motion. A motion vector describes the local image motion trajectory from one field or frame to the next.

Motion vectors can be computed at different levels of spatial resolution, such as at a pixel level, at an image patch level, or at an object level. Computing a motion vector for every pixel independently would theoretically result in an ideal data set, but is unfeasible due to the large number of computations required. Computing a motion vector for each image patch reduces the number of computations, but can result in artifacts due to motion vector discontinuities within an image patch. Computing motion vectors on an object basis can theoretically result in high resolution and lower computational requirements, but object segmentation is a challenging problem.

Therefore what is needed is a way to determine and use motion vectors efficiently and accurately, such that little or no discrepancy exists between an expected image motion due to eye tracking and a displayed image motion in a digital video.

SUMMARY

The present invention provides methods and apparatus for determining and using motion vectors efficiently and accurately, such that little or no discrepancy exists between an expected image motion due to eye tracking and a displayed image motion in a digital video.

In general, in one aspect, the invention provides methods and apparatus, including computer program products, implementing and using techniques for determining motion vectors to be used for interpolation of intermediary frames in a digital video sequence. A first image frame including several image patches is received. Each image patch has a respective first position. A second image frame including one or more image patches corresponding to the image patches in the first image frame is received. Each image patch has a respective second position. For each image patch in the first image frame that has a corresponding image patch in the second frame, the following operations occur: a forward motion vector and a backward motion vector is determined for the image patch in the first image frame; a forward motion vector and a backward motion vector is determined for the image patch in the second image frame; a pair of motion vectors consisting of one motion vector from the first image frame and one motion vector from the second frame is selected; and the selected pair of motion vectors is used to establish an intermediary position of the image patch in an interpolated frame that is intermediary to the first and second frames.

Advantageous implementations can include one or more of the following features. Selecting a pair of motion vectors can include calculating a weight for one or more pairs of motion vectors consisting of one motion vector from the first image frame and one motion vector from the second frame, and selecting the pair of motion vectors having the lowest weight. Calculating a weight can include calculating an absolute difference of an x-component of the motion vector from the first image frame and an x-component of the motion vector from the second image frame, calculating an absolute difference of an y-component of the motion vector from the first image frame and an y-component of the motion vector from the second image frame, adding the calculated absolute differences for the x- and y-components, and multiplying the added calculated absolute differences with a correlation factor for the motion vector from the first image frame and the motion vector from the second image frame.

Multiplying can include calculating a correlation value for the motion vector from the first image frame, calculating a correlation value for the motion vector from the second image frame, adding the two calculated correlation values, and multiplying the added correlation values with the added calculated absolute differences of the motion vector components from the motion vector from the first image frame and the motion vector from the second image frame. Calculating a correlation value for the motion vector from the first image frame can include centering a first window on a pixel in the first image frame that forms an origin of the motion vector, centering a second window on a pixel in the second image frame that forms an end point of the motion vector, the second window having the same dimensions as the first window; and calculating a sum of absolute differences of luma values for the pixels in the first window and pixels at corresponding positions in the second window. The dimensions of the first and second windows can be identical to the dimensions of the image patch.

The pair of motion vectors can consist of one of the following combinations: a forward motion vector from the first image frame and a forward vector from the second image frame, a backward motion vector from the first image frame and a backward vector from the second image frame, and a forward motion vector from the first image frame and a backward vector from the second image frame. Selecting can include selecting any one pair of motion vectors if the image patch is part of a large textured object moving with constant velocity. Selecting can include selecting the forward motion vector from the first image frame and the backward motion vector from the second image frame if the image patch is part of an accelerating object. Selecting can include selecting the forward motion vector from the first image frame and the forward motion vector from the second image frame if the image patch is part of an area being uncovered by a trailing edge of a moving object. Selecting can include selecting the backward motion vector from the first image frame and the backward motion vector from the second image frame if the image patch is part of an area being covered by a leading edge of a moving object. Each image patch can include many pixels.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION OF THE INVENTION

The present invention provides methods and apparatus for determining motion vectors and using determined motion vectors efficiently and accurately, such that little or no discrepancy exists between an expected image motion due to eye tracking and a displayed image motion in a digital video. The motion vectors that are used are selected such that the number of visual artifacts is minimized.

Determining Motion Vectors

First, an exemplary approach of determining motion vectors will be discussed. The motion vector determination described herein uses a recursive hierarchical approach, which has been fully described in the above referenced patent application "Motion Vector Computation for Video Sequences," which is incorporated herein by reference in its entirety. However, it should be realized that regardless of the approach that is chosen for determining motion vectors, the motion vectors can be used for interpolation as described below in the section "Using the motion vectors."

Generally, for motion compensated approaches to work well, including the recursive hierarchical approach described herein, two basic assumptions are made about the nature of the object motion: 1) moving objects have inertia, and 2) moving objects are large. The inertia assumption implies that a motion vector changes only gradually with respect to a temporal vector sampling interval (that is, the frame rate in the digital video). The large objects assumption implies that a motion vector changes only gradually with respect to a spatial vector sampling interval, that is, the vector field is smooth and has only few boundary motion discontinuities.

The goal of the recursive hierarchical method is to find a motion vector by applying a source correlation window to a first image frame and a target correlation window to a subsequent image frame, and placing the target correlation window such that a best match with the source correlation window is obtained, that is, the contents of the source correlation window and target correlation window are as similar as possible. At the same time, the number of calculations needed to perform the matching between the source correlation window and the target correlation window must be as low as possible, while still searching the entire vector space limit. In order to accomplish these goals, the recursive hierarchical method uses multiple resolution levels of the image frames. A best motion vector is first determined for the lowest resolution level by projecting the previous best motion vector at the highest resolution level down to the lowest resolution level, and testing it and one or more updates. This best motion vector is then propagated up to a higher resolution level, where some adjustments are made and a new best motion vector is determined. This new best motion vector is propagated up to yet another higher resolution level, where more adjustments are made and another new best motion vector is determined. This process is repeated until the highest, original, resolution level has been reached and a best motion vector has been identified.

Figure 1:
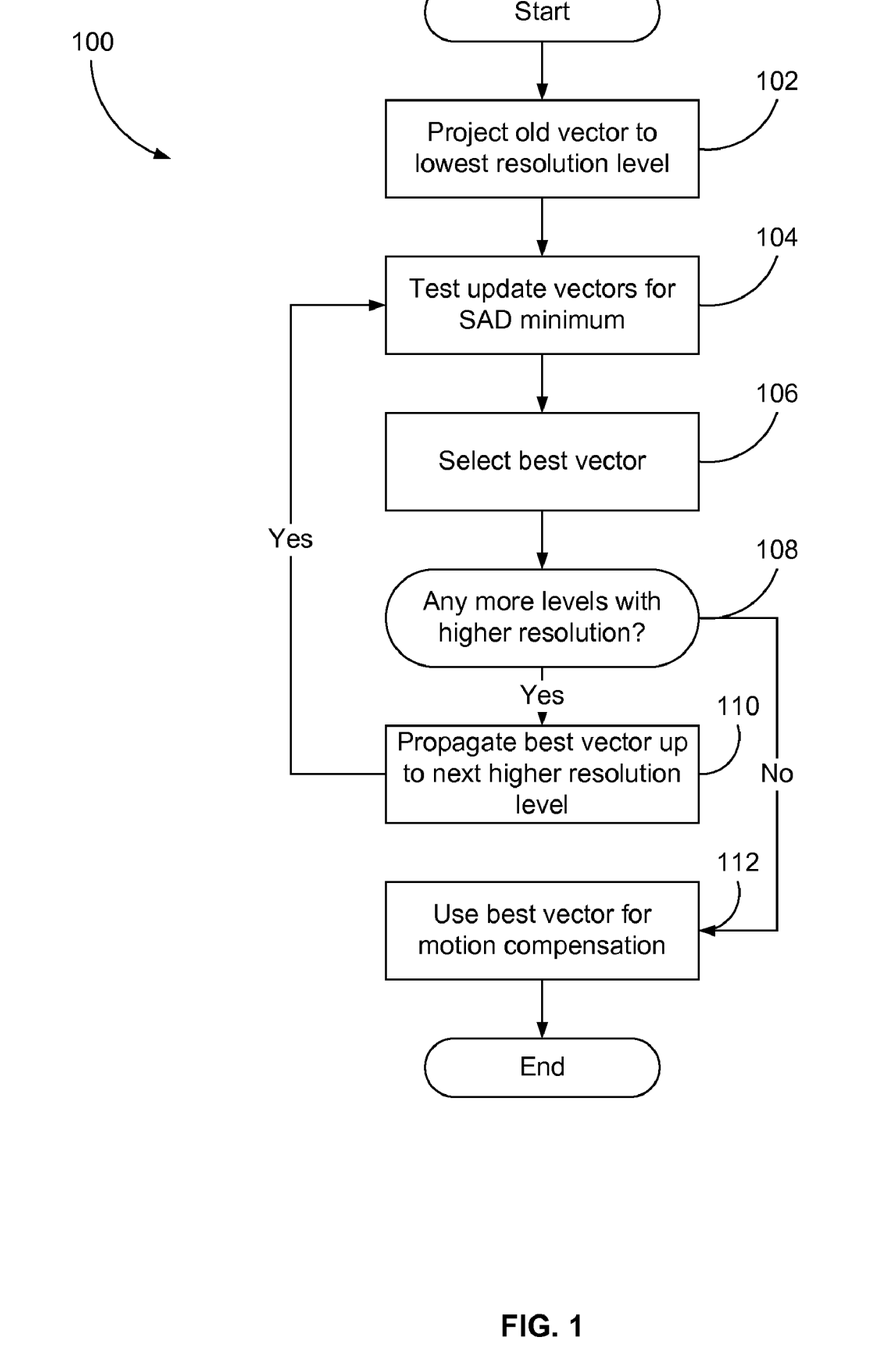
FIG. 1 shows a flowchart of a recursive hierarchical process for determining a motion vector.

FIG. 1 shows one implementation of a recursive hierarchical process (100). It is assumed that multiple resolution levels of the image frames have already been generated. As can be seen in FIG. 1, the recursive hierarchical process (100) for determining a motion vector starts by projecting a motion vector from a previous image frame down to a lowest resolution level (step 102). A set of update vectors is generated and tested to find a best motion vector at this lowest resolution level (step 104). In one implementation this test is performed by comparing pixels in corresponding positions in a source correlation window centered on the origin of the motion vector and a target correlation window centered on the end point of each respective update vector. The comparison can, for example, be performed by subtracting a luma value for each pixel in the source window from the corresponding pixel in the respective target windows. In this case the best match would be defined by finding a minimum sum of absolute differences (SAD) for a source correlation window and a target correlation window pair, and the best motion vector would be the vector associated with this source correlation window and a target correlation window pair.

In one implementation, the SAD is computed by letting the candidate vectors for an image patch, which all originate at the same image patch location in the source frame, point to different pixel locations in a target frame. For each candidate vector, a rectangular window is centered in the target frame on the pixel pointed to by the respective candidate vector. A corresponding rectangular window is centered in the source frame on the pixel where the candidate vectors originate. Then a pair-wise absolute difference of the corresponding luma pixels in the two windows, that is, the pixels that have the same relative location within the two windows, is calculated. The sum of all the absolute differences is the SAD value. The SAD decreases as the window matching becomes better and is ideally zero when the pixels are identical. In practice, of course, due to noise and other factors, the best vector will have a non-zero SAD, but will have the minimum SAD of the vectors in the set of candidate vectors.

After the minimum SAD has been found, the best vector is selected (step 106). The process (100) then examines whether there are any higher resolution levels (step 108). If there are higher resolution levels, the process propagates the best vector up to the next higher resolution level (step 110) and repeats steps 104 through 108. If there are no higher resolution levels, the process proceeds to step 112, where the best vector is selected as the motion vector and is used for motion compensation, which completes the process for the current frame.

In one implementation, a camera vector is also considered when calculating a best motion vector. The camera vector describes a global movement of the contents of the frame, as opposed to the local vectors at each image patch location that are computed completely independently, and can therefore be used to aid in finding a better true motion vector. In several commonly occurring scenarios a motion vector resulting from camera movements at every location in a frame can be predicted quite easily with a simple model. For example, in the case of a camera lens panning across a distant landscape, all the motion vectors will be identical and equivalent to the velocity of the camera. Another scenario is when a camera lens zooms into an object on a flat surface, such as a picture on a wall. All the motion vectors then have a radial direction and increase from zero at the image center to a maximum value at the image periphery.

In one implementation, the process tries to fit a mathematical model to the motion vectors that have been computed using a least squares method. A good fit between the camera motion vectors and the mathematical model indicates that one of the scenarios discussed above likely is present, and the camera model predicted vector can then be used as an additional candidate vector in the next recursive hierarchical vector estimation step. Taking the camera vector into consideration is advantageous in that the recursive portion of the recursive hierarchical search is a local search approach, which may converge into a false local minimum instead of the true minimum. The camera predicted vector candidate can potentially help in avoiding detection of false local minima and direct the process towards a true minimum The main advantage of the recursive hierarchical approach is that at a lower level, an update of a pixel is equivalent to an update of two or more pixels at the next higher level, depending on the difference in resolution between the two levels. If there are, for example, three resolution levels, say 1:1, 1:2 and 1:4, and an update of +/−1 pixel at each level, the convergence delay is potentially reduced by a factor of four. Expressed differently, effectively the resolution hierarchy is used to accelerate the temporal recursion convergence. This results in significant improvements, in particular for frames containing small objects moving with high velocities.

As can be seen from the above discussion, a smooth and accurate vector field is provided by using only a fairly small number of calculations. Furthermore, there is reduced convergence delay due to the multiple levels of resolution. Fewer resolution levels can be used compared to conventional approaches, and vector errors in lower levels are not amplified due to resolution changes at higher resolution levels due to safeguarding by use of projected vectors at each resolution.

Using the Motion Vectors

After the motion vector fields have been estimated for each frame, interpolated frames in between the original frames of the digital video can be computed. The robustness of the interpolation can be increased by using motion vectors from more than one of the original frames. Conventional approaches to generate interpolated frames include generating data values from the candidate vectors followed by a filtering scheme to reduce the visibility of artifacts due to erroneous vectors.

The present invention instead uses a heuristic algorithm to select the best possible candidates from the available set of motion vectors, which further increases the robustness and decreases the number of artifacts. The heuristic algorithm will be discussed in detail below with reference to FIG. 3, and is applicable to situations where there are simultaneously available forward and backward vectors from two adjacent original frames. The heuristic scheme uses both the vector correlation values and the distance between candidate vectors to select a pair of forward vectors, a pair of backward vectors, or a pair consisting of a forward and a backward vector. Before discussing the heuristic algorithm in detail, it is useful to discuss some properties of forward and backward vectors The above discussion has been focused on determining motion vectors between a current frame and a subsequent frame. These motion vectors are typically referred to as forward motion vectors. However, just as forward motion vectors can be determined, the same methodology can be used to determine a motion vector between a current frame and a previous frame. Since this type of motion vector points to a previous frame, it is often referred to as a backward motion vector. Thus, a pair of vectors consisting of one motion vector from a previous frame and one motion vector from a subsequent frame can be used to determine the location of an image patch in an intermediate interpolated frame.

Figure 2:
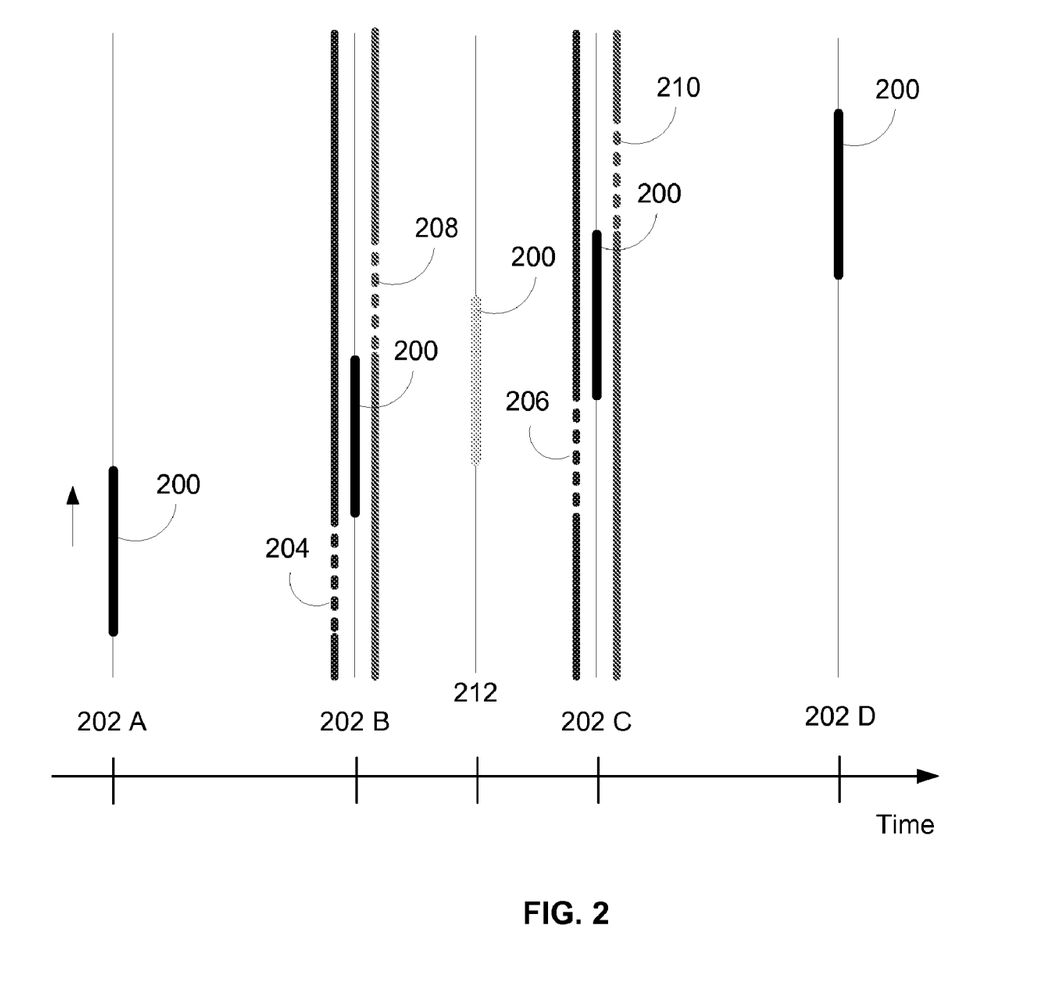
FIG. 2 shows a series of image frames in a digital video of a moving object, and the areas where forward and backward motion vectors can be determined.

It should be noted that there are situations in which it is impossible to determine a forward and a backward motion vector for each of two adjacent frames. One such example is shown in FIG. 2, which shows a simplified one-dimensional object (200) moving along a line upwards in FIG. 2, against a static background in four adjacent image frames (202 A-202 D) in a digital video. Here it is assumed that a location of the object (200) in an interpolated image frame (212) is to be determined between the original frames 202 B and 202 C, using one motion vector from frame 202 B and one motion vector from frame 202 C.

As can be seen in FIG. 2, frame 202 B contains a background region (204) that was previously covered by the object (200) in frame 202 A. Therefore, a backward vector cannot be computed for this background region (204) in frame 202 B. Similarly, frame 202 C contains a background region (206) that was previously covered by the object (200) in frame 202 B, and consequently a backward vector cannot be computed for this background region (206) in frame 202 C. In other words, for areas that are being uncovered by the trailing edge of a moving object, no backward motion vectors can be determined.

Considering the leading edge of the object (200), it can be seen that frame 202 B contains a background region (208) that will be obscured by the leading edge of the object (200) in the following frame 202 C. Therefore, a forward vector cannot be computed for this background region (208) in frame 202 B. Similarly, frame 202 C contains a background region (210) that will be covered by the object (200) in frame 202 D, and therefore a forward vector cannot be computed for this background region (210) in frame 202 C. Stated differently, for areas that are being covered by the leading edge of a moving object in a subsequent frame, no forward motion vectors can be determined. The reader skilled in the art will realize that these two situations are just exemplary, and that other situations, for example, an object moving towards or away from the camera, may occur that make it impossible to determine both forward and backward motion vectors in both adjacent frames. In this situation, the resultant size change of the object from one image frame to a subsequent image frame will cause either visible background to be obscured, or obscured background to be uncovered. Thus, an object moving towards the camera will cause trouble with computation of forward vectors at the object's boundary, whereas an object moving away from the camera will cause trouble with computation of backward vectors at the object's boundary.

Figure 3:
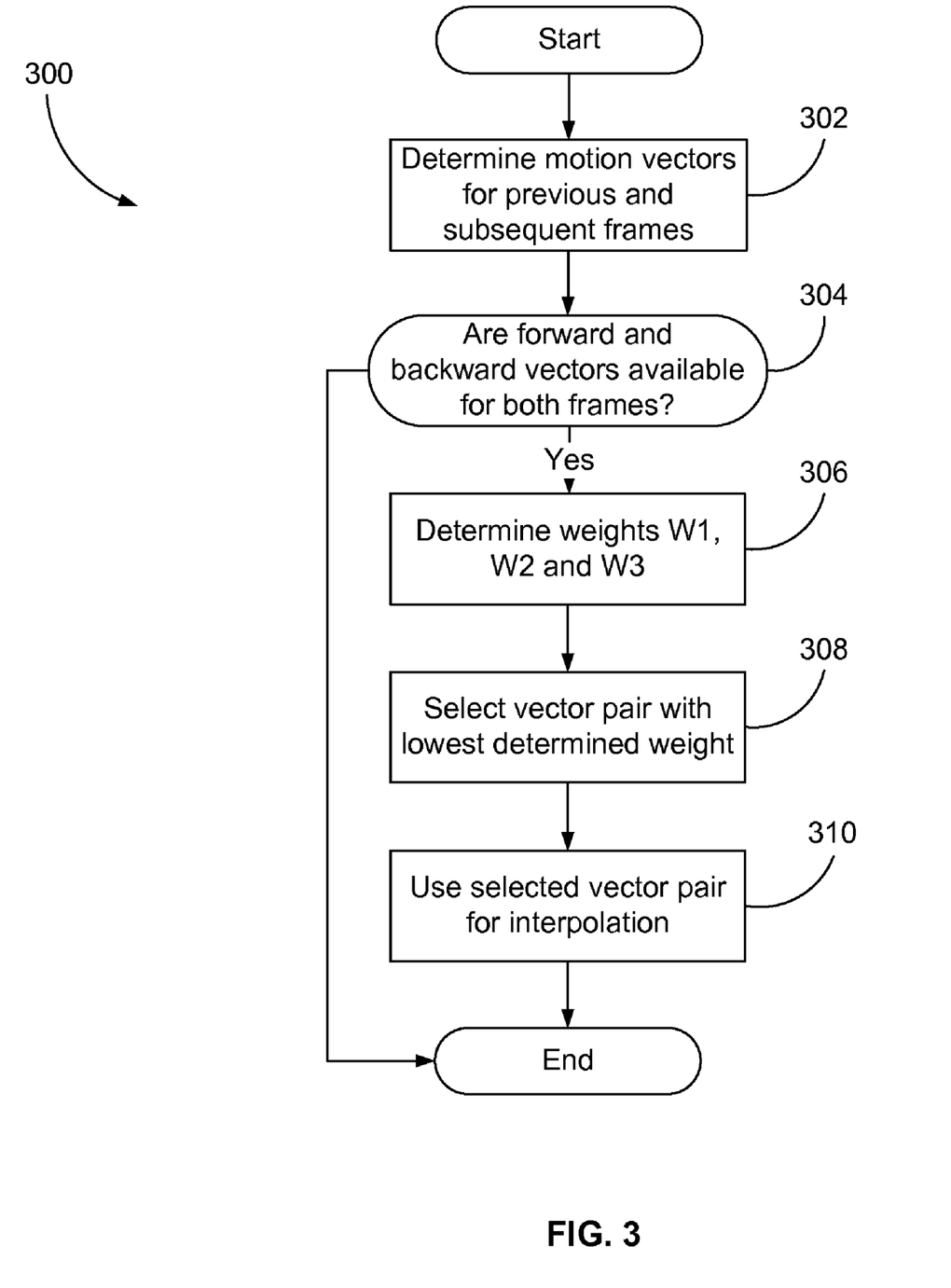
FIG. 3 shows a flowchart of a method for using a pair of motion vectors to interpolate a location of an image patch in an image frame intermediate to two original image frames in a digital video.
Figure 4:
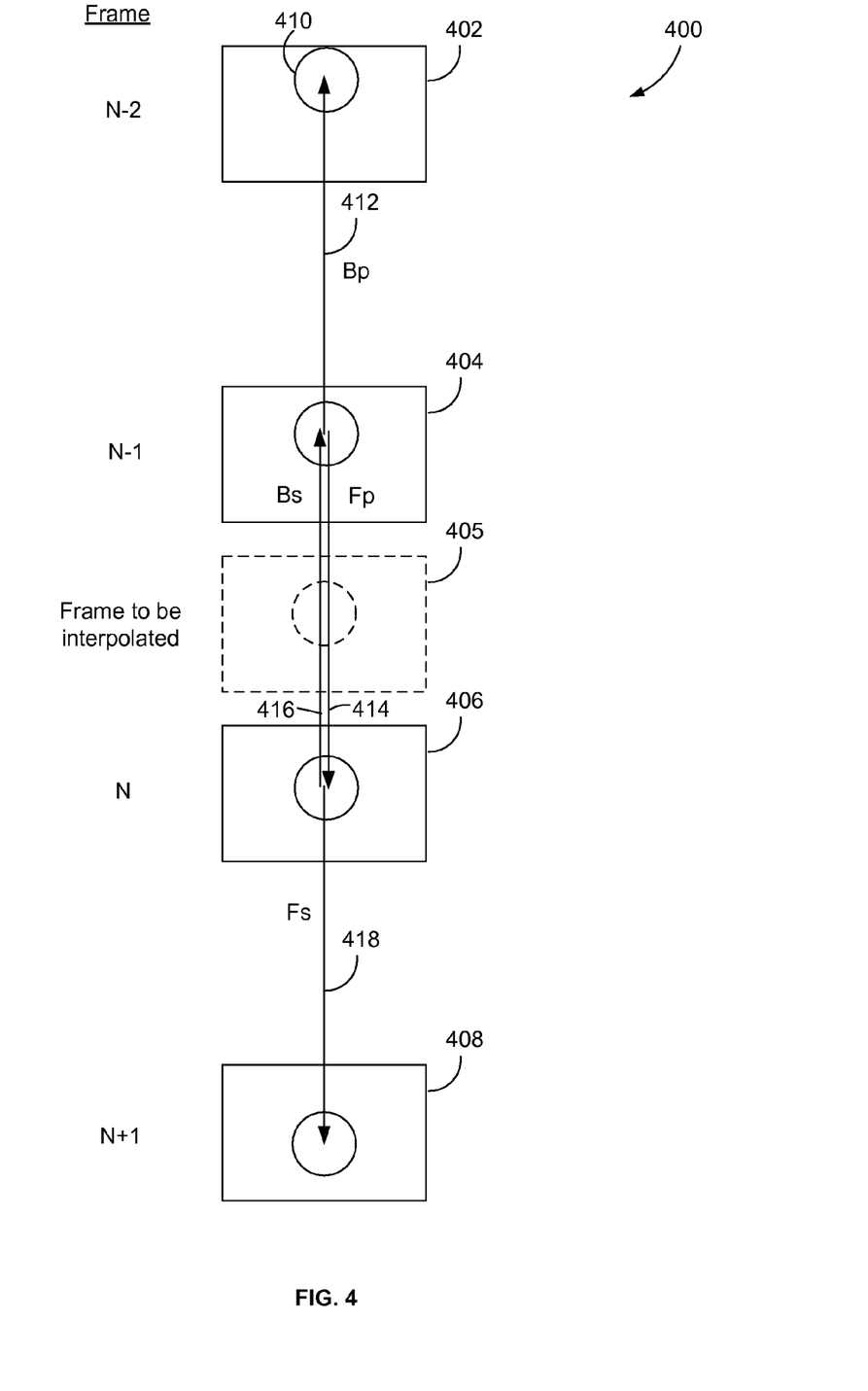
FIG. 4 is a schematic view of a sequence of image frames and associated motion vectors.

FIG. 3 shows a heuristic motion vector selection process (300) that can be used to choose a pair of motion vectors. FIG. 4 shows a sequence (400) of image frames (402; 406, 408; 410), and will be used in conjunction with FIG. 3 to explain the steps of the heuristic motion selection process (300). As can be seen, the process (300) starts by determining motion vectors for two frames (404, 406) that surround a frame (405) that will be interpolated (step 302). These two frames will be referred to as the previous frame (404) and the subsequent frame (406) in relation to the interpolated frame (405).

The motion vectors can be determined with the recursive hierarchical method described above, or with any other suitable method for determining motion vectors. For each frame, the process (300) attempts to determine a forward motion vector (414, 418) and a backward motion vector (412, 416). In the following discussion, the forward motion vector of the previous frame (404) will be labeled Fp (414), the backward motion vector of the previous frame (404) will be labeled Bp (412), the forward motion vector of the subsequent frame (406) will be labeled Fs (418), and the backward motion vector of the subsequent frame (406) will be labeled Bs (416).

Next, the process (300) checks whether there are both forward motion vectors (414, 418) and backward motion vectors (412, 416) available for both the previous frame (404) and the subsequent frame (406) (step 304). If all vectors are not available, the process (300) ends and uses only one motion vector. If all vectors are available, the process (300) selects a pair of vectors to be used for the interpolation of the intermediate frame. As the skilled reader will realize, there are four possible combinations of vector pairs that may be generated from the determined forward vectors (414, 418) and backward vectors (412, 416). These combinations are:

1. Fp (414) and Fs (418)
2. Bp (412) and Bs (416)
3. Fp (414) and Bs (416)
4. Bp (412) and Fs (418)

However, only the first three vector pairs make sense to consider, since both the motion vectors Bp (412) and Fs (418) in the last pair both "point away" from the frame that is to be interpolated, that is, both vectors refer to movement that occurs outside the time interval for which the interpolated frame is to be computed.

Furthermore, different vector pairs among the three remaining vector pairs are more or less suitable in different situations. In the event that the type of object motion can be independently determined, it will often be apparent what vector pair to use when determining the interpolated frame. For example, in the case of a large textured object moving with constant velocity, any one pair of the first three pairs of motion vectors on the above list can be used to generate consistent frame interpolated data, since the object moves the same distance between each image frame.

For an accelerating object, on the other hand, the Fp (414) and Fs (418) vectors are different. For example, if the object (410) is accelerating in the downward direction of FIG. 4, the Fp vector (414) will have a smaller magnitude than the Fs vector (418). Similarly, the Bp (412) and Bs (416) vectors are different. If the same acceleration is assumed, the Bp vector (412) will have a smaller magnitude than the Bs vector (416). However, the Fp vector (414) and the Bs vector (416) are computed over the same frame interval—the Fp vector (414) has the opposite direction and magnitude of the Bs vector (416)—and can therefore be used for the interpolation.

Yet another example is the one discussed above with respect to FIG. 2, of a background area being uncovered at the trailing edge of a moving object. The forward vectors Fp and Fs can always be determined for a background area that is being uncovered at the trailing edge of a moving object, but the backward vectors Bp and Bs can never be determined, since the background area was covered by the object previous frames. For this reason, the (Fp, Fs) vector pair is the only vector pair that can be used for the interpolation.

Similarly, in the case of a background area being obscured at the leading edge of a moving object, the (Bp, Bs) vector pair is the only pair that can be used for the interpolation. No forward vectors can be determined, since the leading edge of the moving object will obscure the background area in subsequent image frames.

If the type of object movement is not known, which is typically the case, the heuristical process continues by determining which vector pair should be used. The process calculates a weight (W1 through W3) for each of the first three motion vector pairs as follows (step 306):

$$W1 = dist(Fp, Fs) * (corr(Fp) + corr(Fs))$$

$$W2 = dist(Bp, Bs) * (corr(Bp) + corr(Bs))$$

$$W3 = dist(Fp, -Bs) * (corr(Fp) + corr(Bs))$$

where dist (A,B) is the distance between vectors A and B, and is calculated as the sum of the absolute differences of the x components of vectors A and B, and the absolute differences of the y components of vectors A and B, respectively. The corr (A) measure is the SAD correlation value for the vector. As was discussed above, the SAD is lower as the local image match increases, that is, as the vector confidence increases.

Next, the process selects the vector pair that gives the lowest determined weight (step 308), since this pair provides the highest consistency. Finally, the selected vector pair is used for final data interpolation (step 310). This heuristic vector selection process increases the robustness of the frame interpolation and minimizes artifacts, which are often manifested as a "shimmering" effect when viewed on a screen, which would occur if only one motion vector was used in the interpolation.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Figure 5:
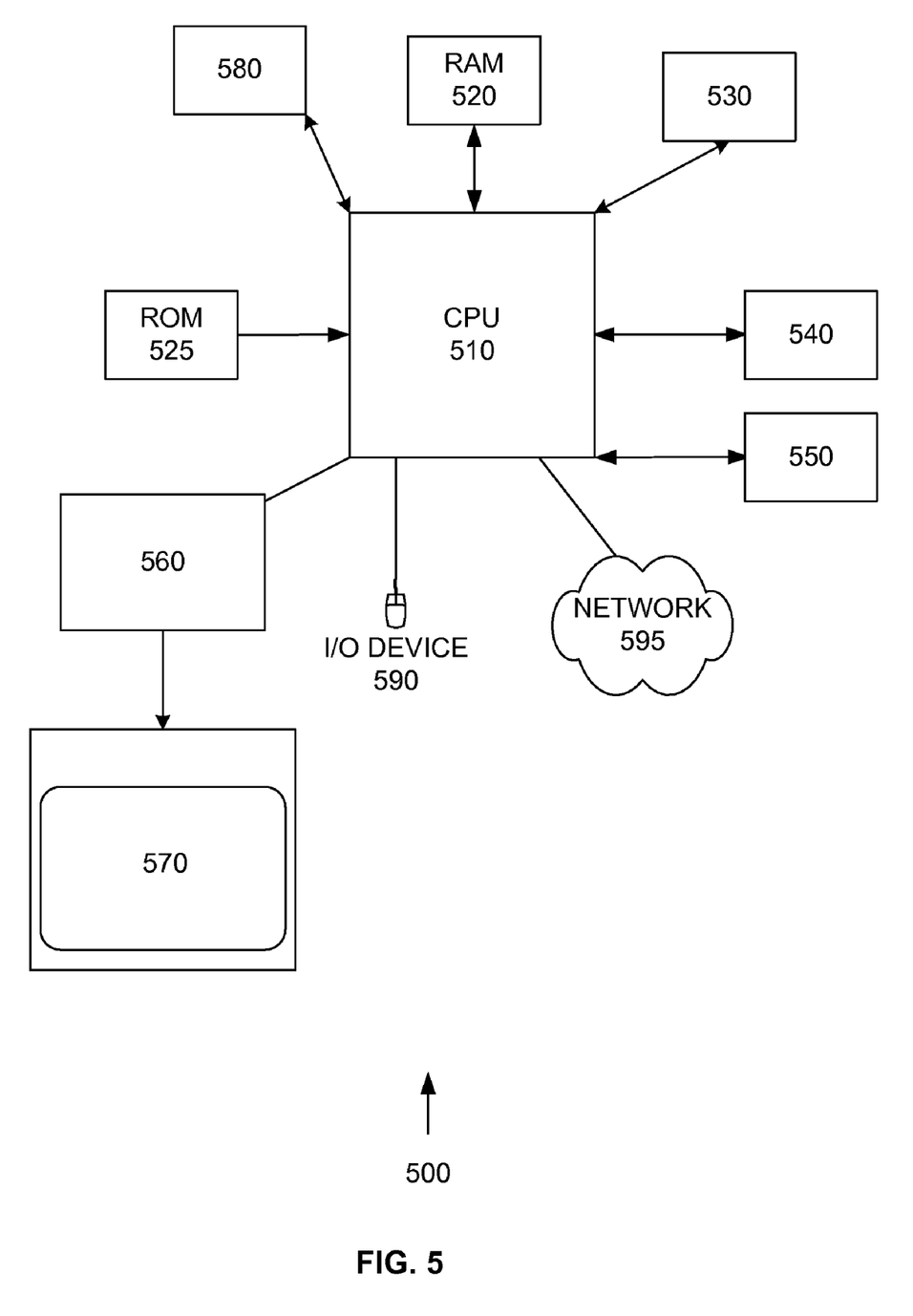
FIG. 5 shows a computer system employed to implement the invention.

FIG. 5 shows a computer system (500) employed to implement the invention. The computer system (500) is only an example of a graphics system in which the present invention can be implemented. The computer system (500) includes a central processing unit (CPU) (510), a random access memory (RAM) (520), a read only memory (ROM) (525), one or more peripherals (530), a graphics controller (560), primary storage devices (540 and 550), and a digital display unit (570). As is well known in the art, ROM acts to transfer data and instructions uni-directionally to the CPUs (510), while the RAM (520) is used typically to transfer data and instructions in a bi-directional manner. The CPUs (510) can generally include any number of processors. Both primary storage devices (540 and 550) can include any suitable computer-readable media. A secondary storage medium (580), which is typically a mass memory device, is also coupled bi-directionally to the CPUs (510) and provides additional data storage capacity. The mass memory device (580) is a computer-readable medium that can be used to store programs including computer code, data, and the like. Typically, the mass memory device (580) is a storage medium such as a hard disk or a tape which generally slower than the primary storage devices (540, 550). The mass memory storage device (580) can take the form of a magnetic or paper tape reader or some other well-known device. It will be appreciated that the information retained within the mass memory device (580), can, in appropriate cases, be incorporated in standard fashion as part of the RAM (520) as virtual memory.

The CPUs (510) are also coupled to one or more input/output devices (590) that can include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs (510) optionally can be coupled to a computer or telecommunications network, e.g., an Internet network or an intranet network, using a network connection as shown generally at (595). With such a network connection, it is contemplated that the CPUs (510) might receive information from the network, or might output information to the network in the course of performing the above-described method steps. Such information, which is often represented as a sequence of instructions to be executed using the CPUs (510), can be received from and outputted to the network, for example, in the form of a computer data signal embodied in a carrier wave. The above-described devices and materials will be familiar to those of skill in the computer hardware and software arts.

The graphics controller (560) generates image data and a corresponding reference signal, and provides both to digital display unit (570). The image data can be generated, for example, based on pixel data received from the CPU (510) or from an external encode (not shown). In one embodiment, the image data is provided in RGB format and the reference signal includes the VSYNC and HSYNC signals well known in the art. However, it should be understood that the present invention can be implemented with data and/or reference signals in other formats.

A number of implementations of the invention have been described. Nevertheless, it will be understood that various modifications can be made without departing from the spirit and scope of the invention. For example in addition to the hierarchical and temporal vectors in the intermediate layers, the camera model generated vector projected down can also be used as a candidate for SAD computation. Furthermore, the motion vectors generated as described above can be used for other purposes than frame rate conversion, such as deinterlacing, noise reduction, and so on. The robustness can also be increased further by, for example, using motion vectors determined for frames that are not immediately adjacent, but instead located two frames away on either side of the interpolated frame in the digital video. Accordingly, other embodiments are within the scope of the following claims.

The invention claimed is:

1. A system for calculating an interpolated image frame of digital video between a previous frame and a subsequent frame of digital video, comprising:
    a processor that is programmed to:
        receive a previous image frame including a plurality of image patches;
        receive a subsequent image frame including one or more image patches corresponding to the image patches in the previous image frame;
        determine if a forward motion vector and a backward motion vector can be determined for image patches in the previous and subsequent image frames;
        wherein for image patches where a forward and backward motion vector can be determined for each of the previous and subsequent image frames, the processor is programmed to select a forward or backward motion vector from each of the previous or subsequent image frames to establish an intermediary position of the image patch in an interpolated frame; and
        for image patches where a forward and backward motion vector cannot be determined for the previous and subsequent image frame, then the processor is programmed to use a single motion vector from the previous or subsequent image frame to establish an intermediary position of the image patch in an interpolated frame that is intermediary to the previous and subsequent frames.

2. The system of claim 1, wherein the processor is programmed to select a combination of forward or backward motion vectors from the previous and subsequent image frames based on which pair of vectors are the closest and which have the best correlation in the previous and subsequent image frames.

3. The system of claim 1, wherein selecting a forward or backward motion vector from each of the previous or subsequent image frames comprises:
    calculating a weight for one or more pairs of motion vectors consisting of one motion vector from the previous image frame and one motion vector from the subsequent image frame; and
    selecting the pair of motion vectors having the lowest weight.

4. The system of claim 3, wherein the processor is programmed to calculate the weight by:
    calculating an absolute difference of an x-component of the motion vector from the previous image frame and an x-component of the motion vector from the subsequent image frame;
    calculating an absolute difference of a y-component of the motion vector from the previous image frame and a y-component of the motion vector from the subsequent image frame;

adding the calculated absolute differences for the x- and y-components; and multiplying the added calculated absolute differences with a correlation factor for the motion vector from the previous image frame and a correlation factor for the motion vector from the subsequent image frame.

5. The system of claim 4, wherein multiplying the added calculated absolute differences with a correlation factor for the motion vector from the previous image frame and a correlation factor for the motion vector from the subsequent image frame comprises:

calculating a correlation value for the motion vector from the previous image frame;

calculating a correlation value for the motion vector from the subsequent image frame;

adding the two calculated correlation values; and multiplying the added correlation values with the added calculated absolute differences of the components of the motion vector from the previous image frame and the motion vector from the subsequent image frame.

6. The system of claim 5, wherein calculating a correlation value for the motion vector from the previous image frame comprises:

centering a first window on a pixel in the previous image frame that forms an origin of the motion vector;

centering a second window on a pixel in the subsequent image frame that forms an end point of the motion vector, the second window having the same dimensions as the first window; and calculating a sum of absolute differences of luma values for the pixels in the first window and pixels at corresponding positions in the second window.

7. The system of claim 6, wherein the dimensions of the first and second windows are identical to the dimensions of the image patch.

8. The system of claim 1, wherein the selected forward or backward motion vector from each of the previous or subsequent image frames consists of one of the following combinations: a forward motion vector from the previous image frame and a forward vector from the subsequent image frame, a backward motion vector from the previous image frame and a backward vector from the subsequent image frame, and a forward motion vector from the previous image frame and a backward vector from the subsequent image frame.

9. The system of claim 1, wherein the processor is programmed to select a forward or backward motion vector from each of the previous or subsequent image frames by:

selecting any one pair of motion vectors if the image patch is part of a large textured object moving with constant velocity.

10. The system of claim 1, wherein the processor is programmed to select a forward or backward motion vector from each of the previous or subsequent image frames by:

selecting the forward motion vector from the previous image frame and the backward motion vector from the subsequent image frame if the image patch is part of an accelerating object.

11. The system of claim 1, wherein the processor is programmed to select a forward or backward motion vector from each of the previous or subsequent image frames by:

selecting the forward motion vector from the previous image frame and the forward motion vector from the subsequent image frame if the image patch is part of an area being uncovered by a trailing edge of a moving object.

12. The system of claim 1, wherein the processor is programmed to select a forward or backward motion vector from each of the previous or subsequent image frames by:

selecting the backward motion vector from the previous image frame and the backward motion vector from the subsequent image frame if the image patch is part of an area being covered by a leading edge of a moving object.

13. The system of claim 1, wherein each image patch includes a plurality of pixels.

* * * * *

UNITED STATES PATENT AND TRADEMARK OFFICE
CERTIFICATE OF CORRECTION

PATENT NO. : 8,335,257 B2
APPLICATION NO. : 12/331304
DATED : December 18, 2012
INVENTOR(S) : Nair et al.

It is certified that error appears in the above-identified patent and that said Letters Patent is hereby corrected as shown below:

Delete the Title Page and substitute the attached Title Page therefor.

Title Page 2, in Item (56), under "FOREIGN PATENT DOCUMENTS", in Column 1, Line 10, delete "9/1995" and insert -- 8/1995 --, therefor.

Title Page 2, in Item (56), under "OTHER PUBLICATIONS", in Column 2, Line 16, delete "110-2004-0100127," and insert -- 10-2004-0100127, --, therefor.

In the Drawings

Delete drawing sheet 3, and substitute the attached drawing sheet 3 therefor.

In the Specification

In Column 1, Line 9, delete "10/866,460 filed Jun. 10, 2004" and insert -- 10/866,460, filed Jun. 10, 2004, --, therefor.

In Column 3, Line 19, delete "DRAWINGS" and insert -- THE DRAWINGS --, therefor.

In Column 6, Line 10, delete "vectors" and insert -- vectors. --, therefor.

In Column 7, Line 5, delete "(402; 406, 408;" and insert -- (402, 406, 408, --, therefor.

In Column 7, Line 38, delete "(418)" and insert -- (418). --, therefor.

Signed and Sealed this
Ninth Day of July, 2013

Teresa Stanek Rea
*Acting Director of the United States Patent and Trademark Office*

(12) United States Patent
Nair et al.

(10) Patent No.: US 8,335,257 B2
(45) Date of Patent: Dec. 18, 2012

(54) VECTOR SELECTION DECISION FOR PIXEL INTERPOLATION

(75) Inventors: Hari N. Nair, Bangalore (IN); Gordon Petrides, San Jose, CA (US)

(73) Assignee: Tamiras Per Pte. Ltd., LLC, Dover, DE (US)

( * ) Notice: Subject to any disclaimer, the term of this patent is extended or adjusted under 35 U.S.C. 154(b) by 1043 days.

(21) Appl. No.: 12/331,304

(22) Filed: Dec. 9, 2008

(65) Prior Publication Data

US 2009/0135913 A1     May 28, 2009

Related U.S. Application Data

(63) Continuation of application No. 10/866,460, filed on Jun. 10, 2004, now Pat. No. 7,499,494.

(60) Provisional application No. 60/532,427, filed on Dec. 23, 2003.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.16
(58) Field of Classification Search ............ 375/240.01
See application file for complete search history.

(56) References Cited

U.S. PATENT DOCUMENTS

| | | |
|---|---|---|
| 4,125,856 A | 11/1978 | Netravali |
| 4,651,211 A | 3/1987 | Weckenbrock |
| 4,652,907 A | 3/1987 | Fling |
| 4,980,764 A | 12/1990 | Henot |
| 5,259,040 A | 11/1993 | Hanna |
| 5,311,306 A | 5/1994 | Tanaka |
| 5,317,397 A | 5/1994 | Odaka |
| 5,400,083 A | 3/1995 | Mizusawa |
| 5,500,686 A | 3/1996 | Yamaguchi |
| 5,519,438 A | 5/1996 | Elliott |
| 5,539,663 A | 7/1996 | Agarwal |

(Continued)

FOREIGN PATENT DOCUMENTS

| | | |
|---|---|---|
| CN | 1127906 | 7/1996 |

(Continued)

OTHER PUBLICATIONS

Hiromatsu, T., et al., "Introduction to Statistics," 1st ed., Asakura Shoten, Ltd., Oct. 15, 1998, 9 pages.

(Continued)

*Primary Examiner* — Nhon Diep
(74) *Attorney, Agent, or Firm* — Christensen O'Connor Johnson Kindness PLLC (57) ABSTRACT

Methods and apparatus, including computer program products, implementing and using techniques for determining motion vectors to be used for interpolation of intermediary frames in a digital video sequence are disclosed. A first image frame including several image patches is received. A second image frame including one or more image patches corresponding to the image patches in the first image frame is received. For each image patch that occurs in both frames, the following operations occur: forward and backward motion vectors are determined for the image patch in the first image frame, forward and backward motion vectors are determined for the image patch in the second image frame, one motion vector from the first image frame and one motion vector from the second frame are selected and the selected motion vectors are used to establish an intermediary position of the image patch in an interpolated frame between the frames.

13 Claims, 5 Drawing Sheets

FIG. 3